(12) United States Patent
Champlin

(10) Patent No.: US 6,598,090 B2
(45) Date of Patent: *Jul. 22, 2003

(54) CENTRALIZED CONTROL OF SOFTWARE FOR ADMINISTRATION OF A DISTRIBUTED COMPUTING ENVIRONMENT

(75) Inventor: Jonathan D. Champlin, Wappingers Falls, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,868

(22) Filed: Nov. 3, 1998

(65) Prior Publication Data

US 2002/0013839 A1 Jan. 31, 2002

(51) Int. Cl.⁷ .............................................. G06F 15/173
(52) U.S. Cl. ..................... 709/244; 709/201; 709/203; 709/223; 709/224; 709/229; 707/10
(58) Field of Search ................... 707/10, 103; 709/202, 709/229, 232, 224, 201, 223, 244, 203; 379/27

(56) References Cited

U.S. PATENT DOCUMENTS

| | | | | |
|---|---|---|---|---|
| 5,550,997 A | * | 8/1996 | Ip et al. ...................... | 711/103 |
| 5,870,555 A | * | 2/1999 | Pruett et al. ................. | 709/223 |
| 5,870,562 A | * | 2/1999 | Butman et al. ............. | 709/238 |
| 5,881,131 A | * | 3/1999 | Farris et al. .................... | 379/27 |
| 5,978,789 A | * | 11/1999 | Griffin et al. ................... | 707/2 |
| 5,995,973 A | * | 11/1999 | Daudenarde ................ | 707/103 |
| 6,012,083 A | * | 1/2000 | Savitzky et al. ............. | 709/202 |
| 6,058,394 A | * | 5/2000 | Bakow et al. ................. | 707/10 |
| 6,076,111 A | * | 6/2000 | Chiu et al. ................... | 709/232 |
| 6,078,924 A | * | 6/2000 | Ainsbury et al. ........... | 707/101 |
| 6,085,249 A | * | 7/2000 | Wang et al. ................. | 709/229 |
| 6,108,664 A | * | 8/2000 | Nori et al. ................... | 707/103 |
| 6,144,959 A | * | 11/2000 | Anderson et al. .............. | 707/9 |
| 6,154,843 A | * | 11/2000 | Hart, Jr. et al. ............. | 713/201 |
| 6,167,446 A | * | 12/2000 | Lister et al. ................. | 709/223 |
| 6,203,433 B1 | * | 3/2001 | Kume .......................... | 463/41 |
| 6,205,122 B1 | * | 3/2001 | Sharon et al. .............. | 370/254 |
| 6,269,401 B1 | * | 7/2001 | Fletcher et al. ............. | 709/224 |

* cited by examiner

*Primary Examiner*—Frantz B. Jean

(57) ABSTRACT

Multiple subroutines in one program, or a series of programs provide centralized network administration. The administrative program monitors communications software for consistency at both server and client locations, monitors logs, objects and files at server and/or client locations and assures that investigative measures be undertaken, either by providing automatic updates or by flagging monitored features for administrative follow-up.

12 Claims, 2 Drawing Sheets

CENTRALIZED CONTROL OF SOFTWARE FOR ADMINISTRATION OF A DISTRIBUTED COMPUTING ENVIRONMENT

FIELD OF THE INVENTION

This invention relates to distributed computing and more specifically to providing centralized administration of software in a distributed computing environment.

BACKGROUND OF THE INVENTION

The introduction of large-scale client-server architectures has allowed users at multiple client machines to access software residing at one or more server machines and to communicate across the distributed network. While each of the servers and each of the remote user environments at the client machines are autonomous for the most part, there exists a need for network administration personnel to be able to control some network features. A concern in network administration is that all locations, both server and client, be running the same versions of the communications software. So-called "bugs" caused by inconsistencies among versions of the same software can interfere with the delivery of communications in a network and can, in fact, completely block the flow of same. It is therefore desirable to maintain consistency of software versions throughout a network. It is further desirable that the consistency be checked by a centralized entity, since individual users may not even be aware that a given piece of software has been updated.

Not only is it desirable that the network administrator assure that the communication software being run at the multiple servers and at the multiple client locations be consistent, but it is also preferable that the administrator be capable of exercising some degree of control over other selected aspects of the server and remote user environments.

One example of the need for administrative control in a communication network is the need to ensure that the necessary degree of security of communications is maintained at each remote location. If a particular remote client machine does not have an appropriate designation for treatment of received and logged communications, or if the client's server-based repository for logged communications does not have the appropriate designation, the integrity of all communications in the network can be compromised. Specifically, a given message may be prepared at one server or client machine and delivered, via one or more servers, with an appropriate level of security; however, if the remote receiving location stores that message in a location from which it may be accessed by any other entity in the network, then all other pre-existing security measures are rendered meaningless. It is desirable to provide a system and method for identifying such areas of exposure.

In addition to software consistency, another aspect of a networked system which should be harmonized is the selection of user "nicknames" for network communications. While each individual server machine and each individual client machine has a unique address in the network, users often prefer to use nicknames which are generally shorter and easier to remember. The nicknames are cross-referenced so that the addresses on incoming or outgoing messages can be translated for delivery. If more that one remote user selects the same nickname, however, the network routing entity will not know which user is the intended addressee for a given communication. It is desirable, therefore, for the network administrator to monitor adopted nicknames to ensure the uniqueness of each.

It is therefore an objective of the present invention to provide for centralized control of certain aspects of distributed computing.

It is a more specific objective of the present invention to monitor both server and client locations on a network to assure consistency of software relating to network communications.

Yet another objective of the present invention is to provide for centralized monitoring of certain network objects at remote server and/or client locations.

Still another objective of the present invention is the monitoring of server and client location logs and files to maximize network efficiency.

SUMMARY OF THE INVENTION

These and other objectives are realized by the present invention wherein multiple subroutines in a single program or a series of programs, provide centralized network administration. The administrative program is adapted for monitoring communications software for consistency at both server and client locations, monitoring logs and files at server locations, monitoring logs, files and objects at client locations, and assuring that corrective measures be undertaken, either by providing automatic updates or by flagging monitored features for administrative follow-up.

BRIEF DESCRIPTION OF THE DRAWINGS

The invention will now be described in greater detail with specific reference to the appended figures wherein.

DESCRIPTION OF THE PREFERRED EMBODIMENT

Figure 1:
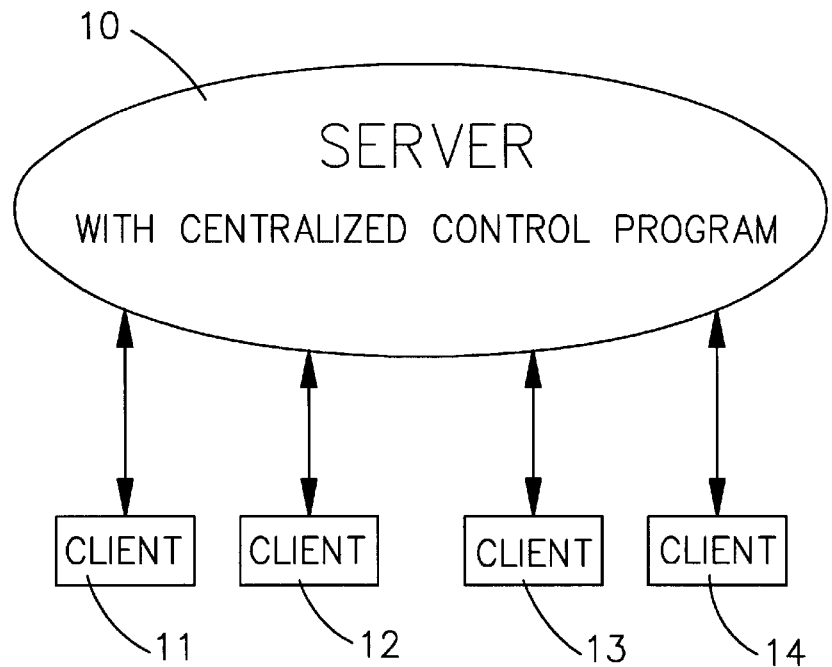
FIG. 1 provides a schematic diagram of a basic client-server network architecture.
Figure 2:
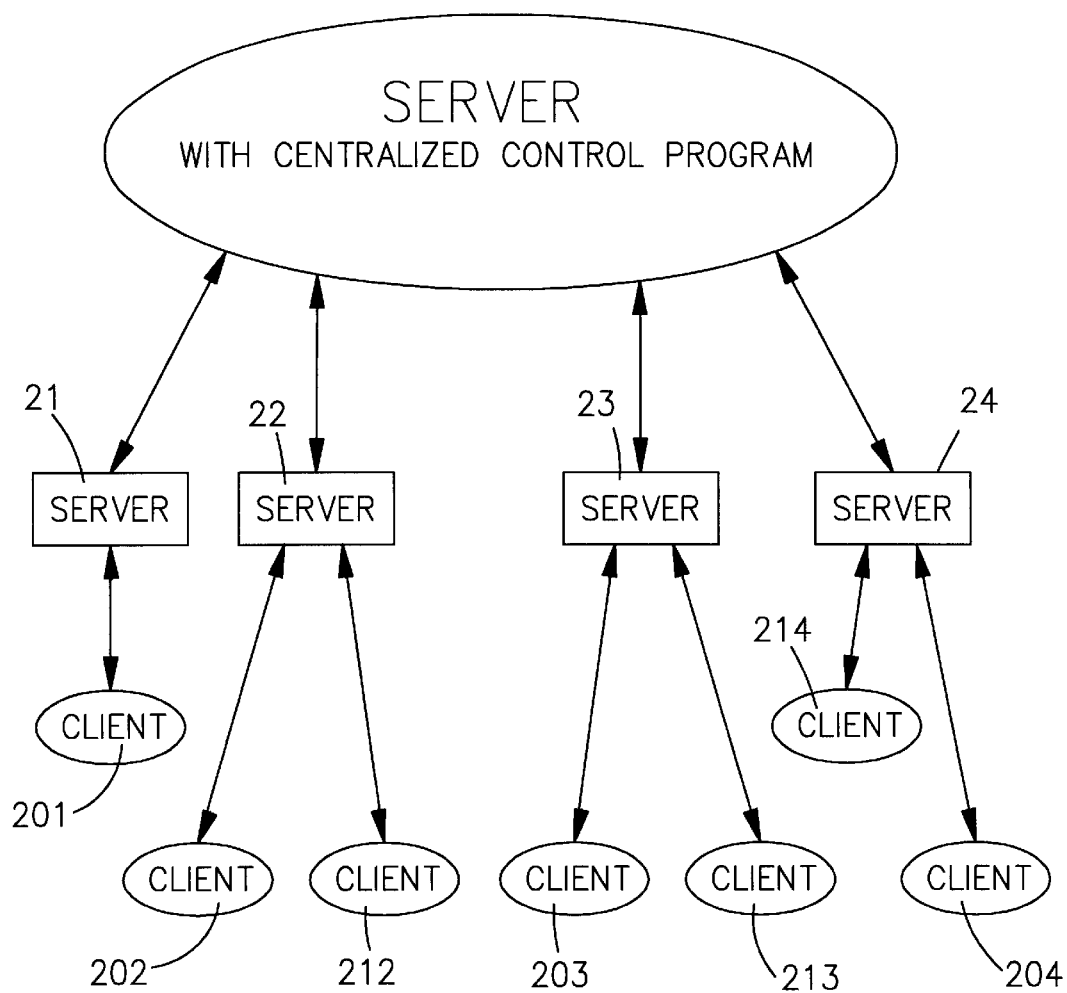
FIG. 2 provides a schematic diagram of a distributed computing environment and of the flow of communications for centralized administrative control in accordance with the present invention.

As illustrated in FIG. 1, a basic client-server computer architecture has a plurality of client locations, 11–14, in communication with server 10. Each client location has resident software for establishing communication with the server and for receiving and processing communications originating from or directed through the server. Communications between each client and the server may be as simple as message passing for electronic mail or may include downloading of software for execution at the client machine. It is the simple communication aspects of the distributed computing environment to which the present invention is addressed. In another network configuration, shown in FIG. 2, the central control facility 20 communicates with servers 21–24 which in turn are in communication with their respective client locations, 202–204 and 212–214.

The invention can be implemented as a single program with multiple subroutines, or may be a series of programs that perform the necessary actions. Hereinafter, each aspect of the inventive monitoring will be referred to as a "program piece", although it is intended that such encompass the embodiment wherein a single program is executing a subroutine for a given function or the alternative embodiment wherein a separate program is executing for the given function. For the purposes of illustration, reference may be made throughout the ensuing description to a distributed client-server environment running Lotus communications software comprising Lotus Notes software at the client locations and Lotus Domino software at the server(s). It is to be understood, however, that the present invention may be implemented for any client-server communications in a distributed network.

In a first aspect, the server 10 of FIG. 1 represents the centralized control entity for implementation of the invention. A centralized control program executing at server 10 monitors features at each of the remote distributed clients. Such monitoring may take the form of issuing a query which is to be actively received and responded to by the client; automatic information provision as part of every network communication, or so-called passive monitoring wherein the location machine is unaware that monitoring is being performed, such that objects, logs, and/or files are scanned and information gathered without requiring location processor intervention. Querying and other information gathering of client information may be done directly by the central control facility, if direct communication between the client locations and the central facility is supported; or, may be done by the intermediate servers with which the client locations are associated, with active or passive communication between the server and the central control facility of client information gathered by and stored at the server. Therefore, processor operations at the client need not be interrupted to serve the administrative request. Fewer than all of the servers and/or clients in a system could be queried or scanned during any given iteration, depending upon such factors as network architecture, past query/poll history, relevant resident software, etc.

Depending upon the content of the information gathered from each location, the centralized control program may flag the file, log, or object for administrative follow-up, as further detailed below, or may automatically effect some change to the monitored features. Querying, scanning or other information gathering may be done on a periodic basis or may be randomly conducted. Yet another alternative is to conduct querying or scanning in response to some network event, such as upon each establishment of a connection, upon detection of an interruption in communication indicative of an inconsistency in the network, or as part of a routing exercise to ensure that global changes have been received and processed.

A first monitoring function which will be detailed is conducted at the server location, wherein a program piece scans all user files and/or databases to determine the default access level for same. The function will be detailed as applied to the scanning of a user's mail files, although the access level for other files and databases should and would be scanned in similar fashion. Such monitoring could be also conducted at a client location on a replicated mail file if communication with the client location is supported by the system. When the default level access for the mail files at a specific location is higher than the designation "No Access", then any users, other than those listed individually or as part of a group on an access control list, would have access to the mail files at that location. With such a default setting, confidential information could be viewed by unauthorized users for possible viewing, editing and/or deleting of mail, as well as access to redesign the mail file.

Upon scanning, the program piece flags the access control list objects for which the default access value is not equal to "No Access" so that an administrative network security entity can further investigate the problem. In addition to flagging the files, the administrative program piece may also prepare a report, directed to administrative personnel, identifying the flagged file. While an administrative program piece could automatically undertake corrective action (i.e., changing the default setting) it may be preferable to use the "flag and follow up" approach since some users may have a legitimate reason for an unorthodox setting (e.g., a shared mail file).

Representative pseudo-code for implementing the foregoing scanning function follows:

```
Process all mail files on selected server
    {
    Get Access Control List object form each mail file
    Check default access level granted in each object
    If(Default access is greater than "No Access")
        {
        Raise a flag that there might be a problem
        Include mail file user's name in exception report
        }
    }
```

Another program piece which can be executed by the centralized control facility scans through all the user's files and databases at a location (either on the remote server or at the client location if direct communication to the client is supported) and determines if any of those files are inheriting from a template which is not supported by the administrative personnel. Once again, for ease of description, scanning of a user's mail file will be detailed as a representative implementation. If the user were using a design for their mail file which had not been approved for use, the user might be having problems receiving and sending mail. Upon detection of such a condition, the program would again raise a flag to alert the appropriate administrative entity that there is a discrepancy. Once again, an automatic response, such as automatic replacement of the template and/or automatically contacting the user to take corrective action, can be undertaken rather than the "flag and follow up" approach. If testing of new templates is ongoing, however, it is preferable to merely raise a flag for administrative follow-up. Representative pseudo-code for the template checking follows:

```
Process all mail files on selected server
    {
    Get "Inherits from" object from each mail file
    Check "Inherits from" object versus a list supplied
        to the program by an administrator
    If("Inherited from" object is not included in supplied list)
        {
        Raise a flag that there might be a problem
        Include mail file user's name in exception report
        }
    }
```

Another program piece of the centralized control administration provides a means for ensuring that the most current system folders are available at all locations. The program piece searches through folders defined for the user and compares each folder to a list of "known" system folders, comprising either a list of all system folders or a list of those system folders which have been recently updated. If a folder matches one entry on the list of system folders, it will be automatically replaced with the most current version. This ensures that all users have the most recent copies of those folders which are centrally managed. If a folder is not on the list of system folders, it is assumed to be a folder which is unique to the user and it is left alone. Automatic replacement is most efficiently conducted by flagging each location at which a folder matches a given system folder on the list and then executing a blanket replacement at the server level.

Representative pseudo-code for the foregoing system folder checking is as follows:

```
Process all mail files on selected server
{
    Get a list of folders defined in each mail file
    For all folders found in the mail file
    {
        If(folder name matches name in system list)
        {
            Ensure that copy is most recent
        }
    }
}
```

Another piece of the centralized management program is one which checks each user's "shortname." Shortnames are used by Lotus and other communications applications to translate communications from outside sources (such as along the Internet) to names that it can "understand". If more than one user chooses to have the same shortname, the system will not know to whom to deliver a message addressed to that shortname. The program piece, therefore, checks shortnames and signals when there is a conflict. The program piece could automatically assign an additional character to one of the shortnames to make it unique; however, it appears to be preferable to include the user in the name change.

Representative shortname pseudo-code follows:

```
Open directory on specified server
Set "Used Shortnames" list to null
For all person document entries in directory
{
    If (User's shortname is in the "Used Shortnames" list
    {
        Include the user's name in an exception report
    }
    Else
    {
        Add user's shortname to the "Used Shortnames" list
    }
}
```

Yet another central management function implemented for electronic communications systems is a program piece which checks user files and databases for activity over time and removes any files for which there has been no activity for an administrator-specified period of time. This aspect of the invention ensures that the database object is actually being used and is not unnecessarily consuming resources.

Representative pseudo-code for the activity monitoring is as follows:

```
Process all mail files on selected server
{
    Check the last activity date one each mail file
    If (Last activity is more than pre-set number of days ago
    {
        Create a backup of the mail file into a hidden directory
        Remove the original copy of the mail file
        Include the user name on an exception report
```

```
    }
}
```

As discussed above, there exists a need for administrative personnel to be able to gather information about the level of software used by each client in order to ensure consistency and aid in troubleshooting. Therefore, a program piece checks which level of code each client is currently using on their machine. Due to the fact that some clients may not be connected to the network at the time the program runs, and that direct client contact may not be supported, the necessary information must be held centrally for the program piece to process. To facilitate this collection, a certain protocol is preferably followed by the client and the server software. This protocol consists of the client software posting its level to its associated server each time a connection is made. The server software records this level in a log file which can later be accessed and processed by the administration staff. The program piece from central server 20 of FIG. 2 then opens network connections, queries each server, 21–24, for the appropriate information and then closes the network connections. Specifically, for a Lotus implementation, the program piece accesses the log.nsf Domino database on every server, processes these log files, extracts the information pertaining to software versions, identifies the version of software being used by clients, and creates a report to the administrative staff indicating which clients need to change their software level. The clients can then be contacted about updating their software. Direct client involvement is preferred over automatic attempts at providing software upgrades, since software installation must be preceded by a determination as to whether the location machine has the appropriate hardware to upgrade.

Representative Lotus software version pseudo-code follows:

```
Process each server in the list
{
    Open each server's log.nsf file
    Gather the appropriate information from "Miscellaneous Events"
        view
    Prune data by extracting all of the lines from the
    Miscellaneous Events view wherein the line contains "Opened
    session for <user name> (<client version>)". When all lines
    have been found, pull out user name/client version pairing
    from each, discard duplicates, place entries into a dynamic
    array for easy access
    Record the data in a local database
}
```

It is also necessary that the servers, themselves, be running current software. Therefore, another aspect of the invention involves gathering information from independent networked computers by querying appropriate sources of information on the remote computers and storing the gathered information into a centralized repository for analysis. Gathering the information into one "warehouse" for the many separate machines reduces the collection burden and eases the processes of troubleshooting and analysis. As with the previously-discussed features of the invention, the server information gathering may be conducted by a single program with multiple subroutines or by a series of programs, and may be incorporated into an administrative program which encompasses all of the foregoing features.

A first program piece for server information-gathering accesses the file on each server which contains the configuration parameters (e.g., notes.ini file on Lotus Domino) for the server. The configuration parameters are inventoried into a centralized database for use by administration personnel. Centralized access to the configuration parameters allows for quick determination of differences among servers in the network and assists in trending analysis. The trending analysis is based upon server performance with different sets of configuration variables. Servers that are performing poorly are quickly checked against servers that are performing better, to make sure that the reason for the performance degradation is not a mis-configured parameter.

Sample pseudo-code for the foregoing is as follows:

```
Build list of servers to inventory
Process each server in the list
    {
    Open each server's configuration file
    Read the configuration file and catalog all information
    a local repository
    }
```

As will occur to one having skill in the art, such process steps as "Build list of servers" need not be repeated in a plurality of program pieces, when a series of subroutines which branch from common steps are employed.

A next aspect of the centralized control is a program piece that queries the replication history log of a certain database (e.g., a directory such as the Name & Address Book) on each server in the network. The replication history for each server is read into a specified central database wherein pertinent information is extracted, sorted into a readable format, and included in an exception report. The report is generated which shows when replication occurred to all servers. If replication has not occurred as expected to a certain server during an expected timeframe, an administration representative can follow up based upon the report. It is to be noted that the consequences of replication not occurring include that access groups may be out of date and that mail routing schemes may be out of sync.

Representative pseudo-code for replication checking follows:

```
Build list of servers to query
Process each server in the list
    {
    Open the database specified on the server
    Read replication information in the database
    Extract pertinent information and sort into readable format
    Create an exception report of databases that have not
replicated in a certain timeframe
    }
```

Another server administration feature is to build a group list of all users whose mail files are defined to each server in the network. Such a list is useful for sending communications to certain subsets of the user population. The program piece is run on a scheduled basis, thus allowing the groups to remain up-to-date. The groups are stored in a centralized location so that the most recent copies can be accessed by the appropriate personnel.

The following sample pseudo-code illustrates the processing of such groups:

```
Open the directory on a specified server
For all servers containing defined users (i.e., mail servers)
    {
    Ensure that the master group name ("<Mail Server name> Users")
    exists in the directory
    Populate the group with all of the users defined to the server
    }
```

Figure 3:
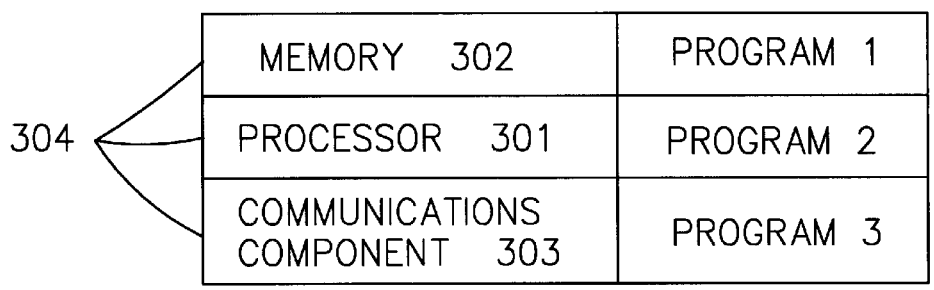
FIG. 3 provides a schematic representation of the centralized control facility in accordance with the present invention.

Each of the above-described program pieces facilitates the effective functioning of a network in a way which was previously unavailable. By providing centralized information gathering and control of server and client information, the inventive system and method assures that the most recent software is being run at all locations, and provides troubleshooting and security measures. FIG. 3 depicts a schematic of the administrative control facility and its components. As previously noted, the administrative control facility need not be "central" in that the administrative components could be incorporated into any server already in a network, provided that the necessary communications are supported. It will be apparent to one having skill in the art that the illustrated components may be local or remotely located and that one or more of the components may be combined provided that the attendant functionality is not lost. The administrative control facility includes at least one processor 301, at least one storage facility 302, communications means 303, and program piece(s) 304. The storage facilities could be either remote, local, or both, and should include temporary storage for gathered information, permanent storage (e.g., tables) for grouping information, etc., and read only memory for program pieces. The program or programs should include at least a querying or a scanning component, or preferably both, for creating the communication which is provided to the communication means for gathering information from locations. In addition, the program or programs includes a response component for receiving and processing the gathered information and for generating a response based upon the content of that gathered information. As discussed above, the response may be in the form of flag setting, report generating, and/or automatic correction, change or updating of the content of the information at the location. The processing of gathered information may include updating centrally-stored tables, comparing gathered information to system control information or other centrally-stored information, and computing activity frequency and comparing the computed frequency to a threshold. When up-to-date information is to be supplied to the locations, the response processing component will additionally prepare single or blanket communications for delivery to identified locations. While communication to an intermediate server location may lessen the overhead associated with information gathering at the control location for certain information, the processing of such information and preparation of appropriate responses will still be undertaken at the control location.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A control facility for providing network administration for a network comprising at least one server location and a plurality of client locations associated with each of said at least one server, comprising:

at least one processing component for gathering stored software program information from said locations on said network and for evaluating the content of said program information;

at least one storage component associated with said at least one processing component for storing program information gathered from said locations;

at least one communication component for effecting communication from said at least one processing component along said network in response to said evaluating;

a response generating component for generating a response based upon the evaluating of the content of said program information gathered from at least one of the network locations, for identifying the network location from which said content was gathered, and for automatically replacing said program information at said network location.

2. The control facility of claim 1 wherein said at least one processing component comprises a querying component for generating a query to at least one of said locations in said network and a receiving component for receiving and processing information gathered in response to said query and for generating at least one response based upon the evaluating of the content of said program information.

3. The control facility of claim 1 wherein said at least one processing component comprises a scanner component for scanning at least one of said locations in said network and a receiving component for receiving and processing information gathered from said scanning and for generating a response based upon the evaluating of said program information.

4. The control facility of claim 1 wherein said at least one processing component comprises a querying component for generating a query to at least one of said locations in said network, a scanner component for scanning at least one of said locations in said network and a receiving component for receiving and processing information gathered by said processing component and for generating a response based upon the evaluating of the content of said program information gathered from at least one of said network locations.

5. A network comprising:

at least one server network location;

a plurality of client network locations, each associated with one of said at least one server locations; and an administrative control facility for gathering and evaluating the content of stored software program information gathered from one or more of said at least one server location and said plurality of client network locations, said administrative control facility comprising at least one processing component for gathering information about said network, said at least one processing component comprising a querying component for generating a query to at least one of said locations in said network, a scanner component for scanning at least one of said locations in said network, and a receiving component for receiving and processing information gathered by said processing component and for generating a response based upon the evaluating of the content of information gathered from at least one of said network locations and for automatically replacing said program information at said network location; at least one storage component associated with said at least one processing component; and at least one communication component for effecting communication from said at least one processing component along said network.

6. The facility of claim 5, wherein said administrative control facility is located at one of said at least one server network locations.

7. The system of claim 5, wherein said administrative control facility is located in a central control facility.

8. The system of claim 5, wherein at least one of said at least one server network locations additionally comprises client information gathering means and at least one storage facility for storing information gathered by said client information gathering means.

9. A method for providing administration of a network comprising at least one server network location and a plurality of client network locations, each associated with a server network location comprising the steps of:

gathering and evaluating stored software program information from at least one of said at least one server location and said plurality of client network locations;

identifying replaceable information at said locations by comparing gathered information to stored information; and preparing a response based upon said evaluating of the content of said program information, said preparing a response comprising automatically replacing replaceable information at said locations.

10. The method of claim 9 wherein said gathering comprises querying said locations for program information.

11. The method of claim 9 wherein said gathering comprises scanning said locations and obtaining said program information without involvement of processing components at said locations.

12. The method of claim 9 wherein said preparing a response comprises flagging locations from which program information is gathered.

* * * * *